C. E. HOLMES.
Oiling-Apparatus for Loose Pulleys or Wheels.
No. 148,062. Patented March 3, 1874.
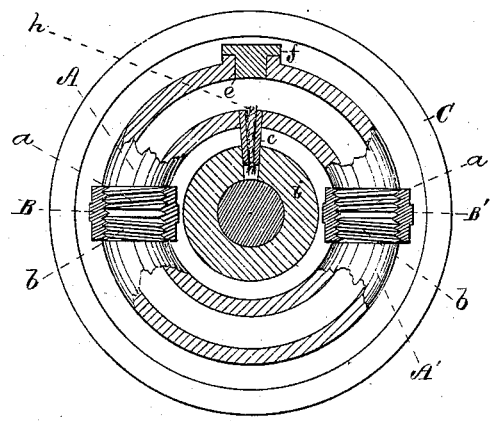
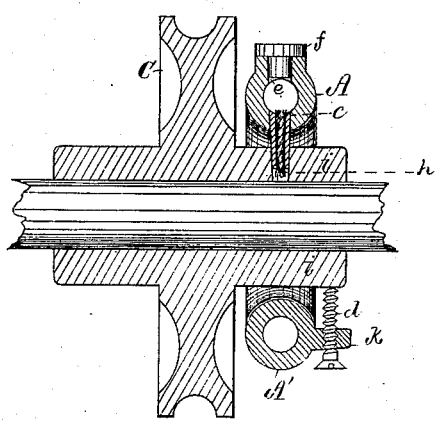
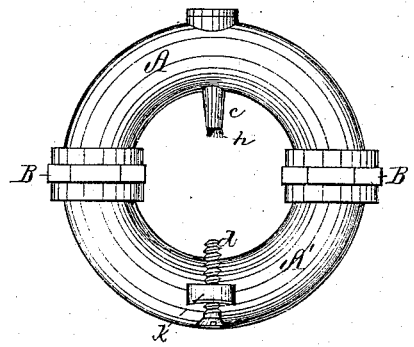
Witnesses. Charles E. Holmes.
By his attorney.

UNITED STATES PATENT OFFICE.

CHARLES E. HOLMES, OF EXETER, NEW HAMPSHIRE.

IMPROVEMENT IN OILING APPARATUS FOR LOOSE PULLEYS OR WHEELS.

Specification forming part of Letters Patent No. 148,062, dated March 3, 1874; application filed December 27, 1873.

*To all whom it may concern:*

Be it known that I, CHARLES E. HOLMES, of Exeter, of the county of Rockingham and State of New Hampshire, have invented an Improved Apparatus for Lubricating Loose Pulleys or Wheels, or the bearings or journals thereof; and do hereby declare the same to be fully described in the following specification and represented in the accompanying drawings, of which—

Figure 1 denotes a longitudinal section, and Fig. 2 a transverse section, of the apparatus applied to a band-wheel or loose pulley. Fig. 3 is a front elevation of it as separate from the pulley or wheel.

It is composed of two tubular semi-rings, A A', connected by right-and-left screws $a\ a\ b\ b$ and nuts B B', and provided with an educt or eduction tube, $c$, and a clamp or holding screw, $d$. all being arranged and constructed substantially as represented. At the crown of the semi-ring, from which the educt projects, and arranged with such educt, is an opening or induct, $e$, furnished with a plug or cover, $f$. The educt, when in use, is intended to receive a wick, $g$, and to extend into a hole, $h$, made in the hub $i$ of the wheel or loose pulley C. The lubricator or oiler is held to the hub by means of the educt and the clamp-screw, which screws through an ear, $k$, projecting from the oiler.

The object of making the tubular oiler in two semi-tubular rings, provided with connections or right-and-left screws and nuts, as shown, is to enable such oiler to be readily applied to or removed from a wheel or pulley, while arranged on its shaft or journal, without the necessity of first removing the wheel therefrom.

By means of the right-and-left screw-nuts, the next adjacent ends of the semi-tubes may be drawn closely together, or upon packing or packing-rings inserted between them, so as to form close joints.

The oiling apparatus, when in use, extends concentrically, or thereabout, around the wheel-hub $i$, as shown in the drawings, and it revolves with the hub. On the apparatus being charged with oil and put in movement with the wheel, the lubricating fluid, during each revolution, and while the educt is in its lowest position, will stand at a level above the educt, and consequently will press up through the wick and be more or less discharged upon the wheel journal or shaft, so as to effect lubrication of the bearing and journal.

I do not claim an oiler arranged to encompass the wheel hub or bearing, and open into such; but

I claim—

The oiler, composed of the two tubular semi-rings A A', connected by screws $a\ a\ b\ b$ and nuts B B' as described, and provided with the educt $c$ and the holding-screw $d$, all being combined substantially as represented.

CHARLES E. HOLMES.

Witnesses:
R. H. EDDY,
J. R. SNOW.